(12) United States Patent
Kometani et al.

(10) Patent No.: US 7,067,949 B2
(45) Date of Patent: Jun. 27, 2006

(54) ROTARY ELECTRIC MACHINE

(75) Inventors: Haruyuki Kometani, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/832,242

(22) Filed: Apr. 27, 2004

(65) Prior Publication Data

US 2004/0251766 A1 Dec. 16, 2004

(30) Foreign Application Priority Data

May 12, 2003 (JP) ............................. 2003-133182

(51) Int. Cl.
*H02K 3/28* (2006.01)
(52) U.S. Cl. .................. 310/184; 310/179; 310/207; 310/254
(58) Field of Classification Search ................ 310/179, 310/180, 184, 156.66, 254, 207
See application file for complete search history.

(56) References Cited

U.S. PATENT DOCUMENTS

| | | | | |
|---|---|---|---|---|
| 4,959,577 A | * | 9/1990 | Radomski ............... | 310/263 |
| 5,483,116 A | * | 1/1996 | Kusase et al. ........... | 310/263 |
| 6,396,185 B1 | | 5/2002 | Asao et al. | |
| 6,504,283 B1 | * | 1/2003 | Asao et al. ............. | 310/254 |
| 2002/0158539 A1 | * | 10/2002 | Oohashi et al. .......... | 310/207 |
| 2003/0107287 A1 | * | 6/2003 | Nishimura et al. ....... | 310/180 |
| 2003/0230949 A1 | * | 12/2003 | Ogawa et al. ........... | 310/180 |

FOREIGN PATENT DOCUMENTS

| | | |
|---|---|---|
| GB | 504 800 A | 5/1939 |
| JP | 61 221 559 A | 10/1986 |
| JP | 9-154266 A | 6/1997 |
| JP | 3242635 B2 | 10/2001 |

OTHER PUBLICATIONS

Patent Abstract of Japan vol. 011, No. 061, (Feb. 25, 1987).

* cited by examiner

*Primary Examiner*—Burton Mullins
(74) *Attorney, Agent, or Firm*—Sughrue Mion, PLLC

(57) ABSTRACT

An X-phase winding phase portion, a Y-phase winding phase portion, and a Z-phase winding phase portion constituting a three-phase stator winding are each constructed by zigzag-connecting winding phase sub-portions having a phase difference corresponding to an electrical angle of 36 degrees (36°). The rotor is a claw-pole rotor, and permanent magnets are interposed between claw-shaped magnetic poles.

7 Claims, 15 Drawing Sheets

ROTARY ELECTRIC MACHINE

BACKGROUND OF THE INVENTION

1. Field of the Invention

The present invention relates to a rotary electric machine provided with a stator having slots formed at a ratio of two slots per phase per pole and a rotor for generating a magnetic flux with a field winding and a permanent magnet.

2. Description of the Related Art

Conventional automotive alternators are provided with: a stator in which a stator winding is mounted to a stator core, and a rotor for generating a magnetic flux with a field winding and permanent magnets. In this stator core, slots are formed at an even angular pitch at a ratio of two slots per phase per pole. The stator winding is constructed by three-phase zigzag-connecting windings installed in the stator core. A solid core is used for the magnetic field poles, and a field winding is added to a central axis to construct a claw-pole rotor. (See Patent Literature 1, for example.)

Patent Literature 1: Japanese Patent Laid-Open No. HEI 9-154266 (Gazette: FIG. 22)

In conventional automotive alternators, eddy current loss is generated by harmonics at the rotor surface due to stator magnetomotive force harmonics arising due to stator winding currents and permeance harmonics in an air gap caused by stator slots (hereinafter called "slot harmonics") giving rise to poor efficiency, and also to deficiencies in performance such as temperature increases in the rotor and bearings, etc. Since the rotor is solid, the eddy current loss at the rotor surface is large.

Thus, one disadvantage has been that heat generated by this eddy current loss at the rotor surface may give rise to thermal demagnetization of the permanent magnets disposed between the claw-shaped magnetic poles.

Because permanent magnets are provided in the rotor, an induced voltage accompanying rotation of the rotor is generated in the stator winding even in a field de-energized state. Thus, another disadvantage has been that in a high-speed rotation region, this induced voltage may exceed a power supply voltage and an element breakdown voltage.

In addition, if a conventional automotive alternator is used as an electric motor by performing inverter control, it is necessary to establish a voltage limit based on a break-down voltage of semiconductor elements constituting the inverter. Thus, if permanent magnets are provided in the rotor, the induced voltage occurring in the stator winding must be controlled in response to the rotational frequency so as not to exceed the voltage limit. Since this induced voltage will seriously affect the elements if it exceeds the voltage limit even for an instant, instantaneous overvoltages due to harmonics in the induced voltage generated by the permanent magnets are also considered a problem. Consequently, it is desirable for the permanent magnets to be constructed such that their harmonic components are reduced.

SUMMARY OF THE INVENTION

The present invention aims to solve the above problems and an object of the present invention is to provide a rotary electric machine enabling eddy current loss at a rotor surface to be reduced, and harmonic components of an induced voltage induced by a permanent magnet also to be reduced.

With the above object in view, a rotary electric machine of the present invention includes: a stator having an annular stator core in which two slots are disposed per phase per pole; and a three-phase stator winding mounted to the stator core; and a rotor rotatably disposed inside the stator for generating a magnetic flux by means of a field winding and a permanent magnet. The three-phase stator winding includes a plurality of winding phase sub-portions each installed in a slot group constituted by every sixth slot of the slots. An X-phase winding phase portion, a Y-phase winding phase portion, and a Z-phase winding phase portion constituting the three-phase stator winding are each constructed by connecting in series the stator winding phase sub-portions installed in an adjacent pair of the slot groups. Further, slots are formed at a nonuniform pitch in which an angle between center lines of slot opening portions alternates between an electrical angle of α and (60°−α), where a does not equal 30 degrees (α≠30°).

Whereby, eddy current loss at a rotor surface is reduced, and harmonic components of an induced voltage induced by the permanent magnet are reduced.

DETAILED DESCRIPTION OF THE PREFERRED EMBODIMENTS

Preferred embodiments of the present invention will now be explained with reference to the drawings.

EMBODIMENT 1

Figure 1:
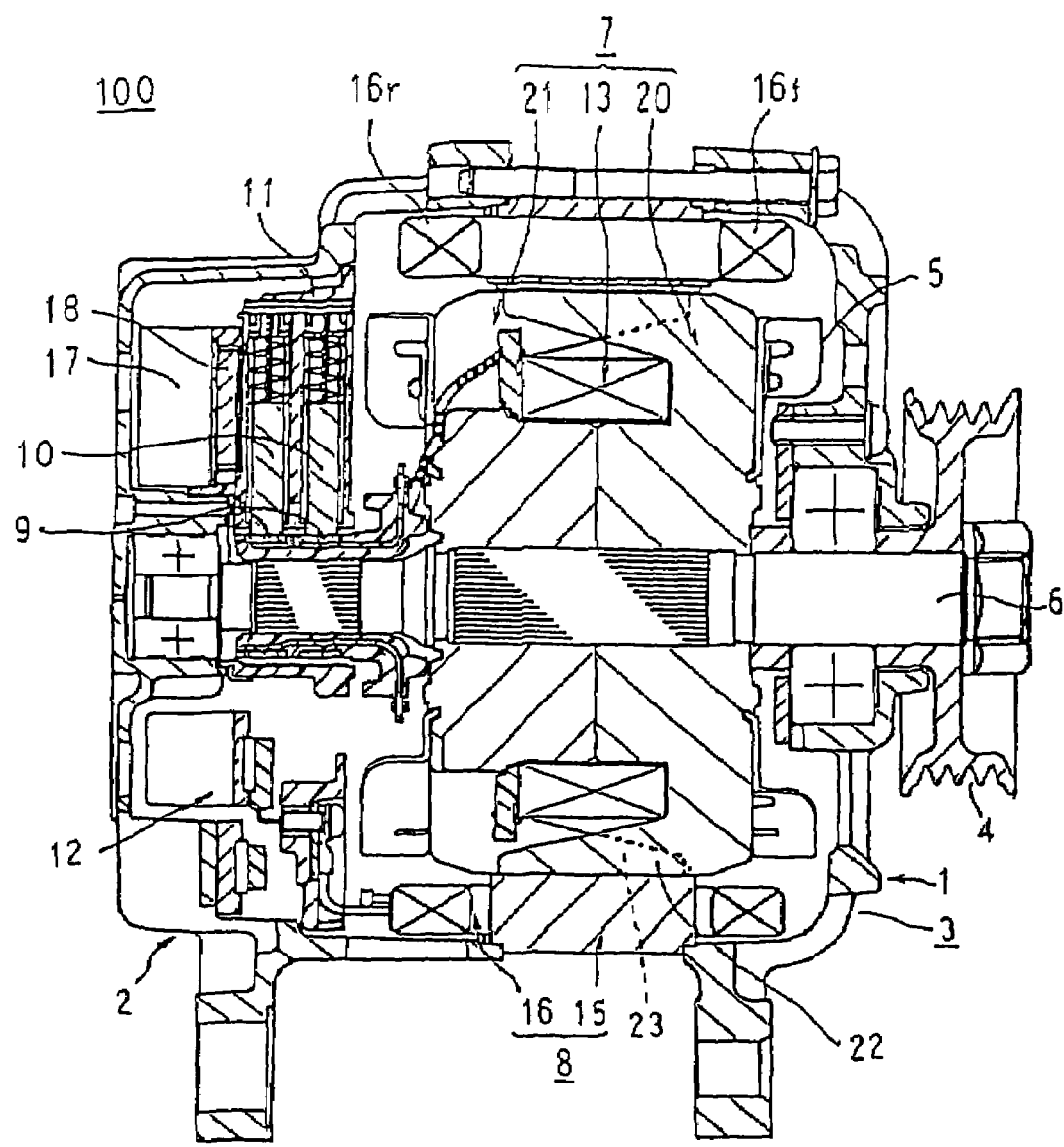
FIG. 1 is a longitudinal section showing a rotary electric machine according to Embodiment 1 of the present invention.

FIG. 1 is a longitudinal section showing a rotary electric machine according to Embodiment 1 of the present invention.

In FIG. 1, a rotary electric machine 100 is provided with: a case 3 constituted by a front bracket 1 and a rear bracket 2 made of aluminum; a shaft 6 disposed inside the case 3, a pulley 4 being secured to a first end portion of the shaft 6; a claw-pole rotor 7 secured to the shaft 6; fans 5 secured to first and second axial end portions of the rotor 7; a stator 8 secured to the case 3 so as to envelop the rotor 7; a pair of slip rings 9 secured to a second end portion of the shaft 6 for supplying electric current to the rotor 7; a pair of brushes 10 each sliding on a surface of the slip rings 9; a brush holder 11 for accommodating the brushes 10; a rectifier 12 electrically connected to the stator 8 for converting an alternating current generated in the stator 8 into a direct current; and a regulator 18 mounted to a heat sink 17 fitted onto the brush holder 11, the regulator 18 adjusting the magnitude of an alternating voltage generated in the stator 8.

The rotor 7 includes: a field winding 13 for generating a magnetic flux on passage of an electric current; and a pair of first and second pole cores 20 and 21 disposed so as to cover the field winding 13, magnetic poles being formed in the first and second pole cores 20 and 21 by the magnetic flux from the field winding. The first and second pole cores 20 and 21 are made of iron, having four first and four second claw-shaped magnetic poles 22 and 23, respectively, each of the claw-shaped magnetic poles 22 and 23 having a generally trapezoidal outermost diameter surface shape disposed on an outer circumferential edge portion at a uniform angular pitch in a circumferential direction so as to project axially, and the first and second pole cores 20 and 21 being fixed to the shaft 6 facing each other such that the first and second claw-shaped magnetic poles 22 and 23 intermesh.

The stator 8 is held between the front bracket 1 and the rear bracket 2 such that a uniform air gap is formed between outer circumferential surfaces of the claw-shaped magnetic poles 22 and 23 and an inner circumferential surface of a stator core 15.

Figure 2:
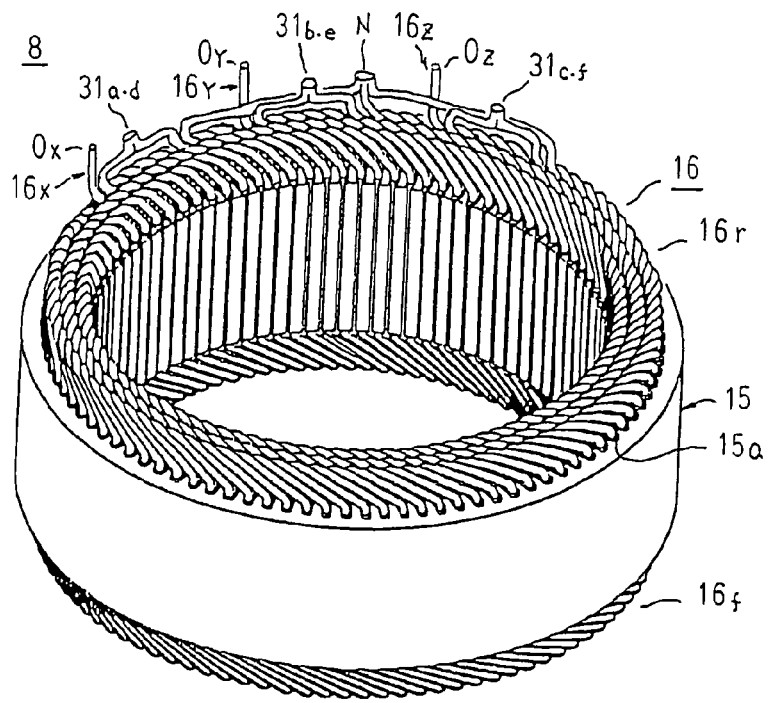
FIG. 2 is a perspective showing a stator used in the rotary electric machine according to Embodiment 1 of the present invention.
Figure 3:
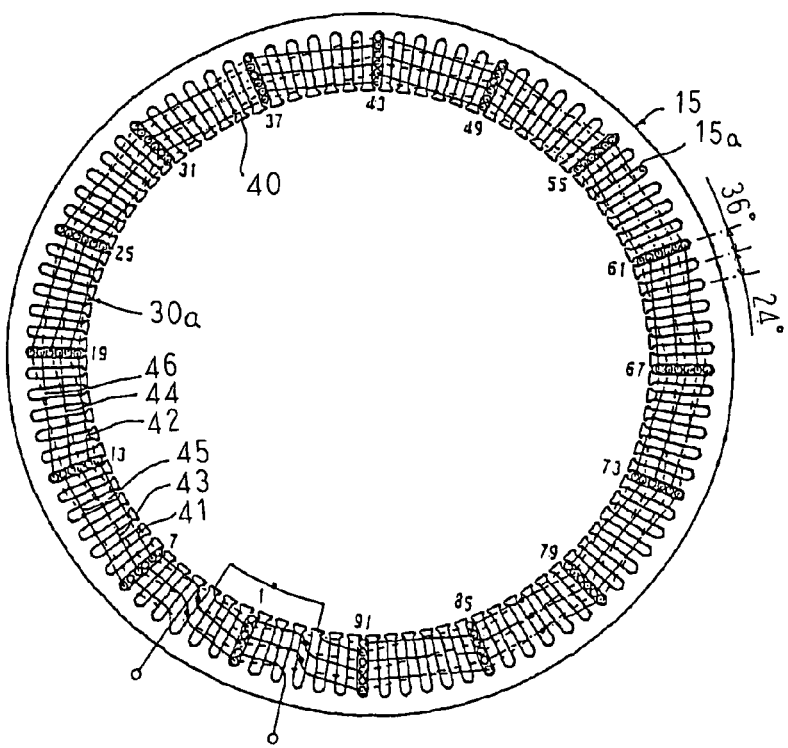
FIG. 3 is a rear-end end elevation schematically showing a first single-phase winding phase portion of a stator winding in the stator used in the rotary electric machine according to Embodiment 1 of the present invention.
Figure 4:
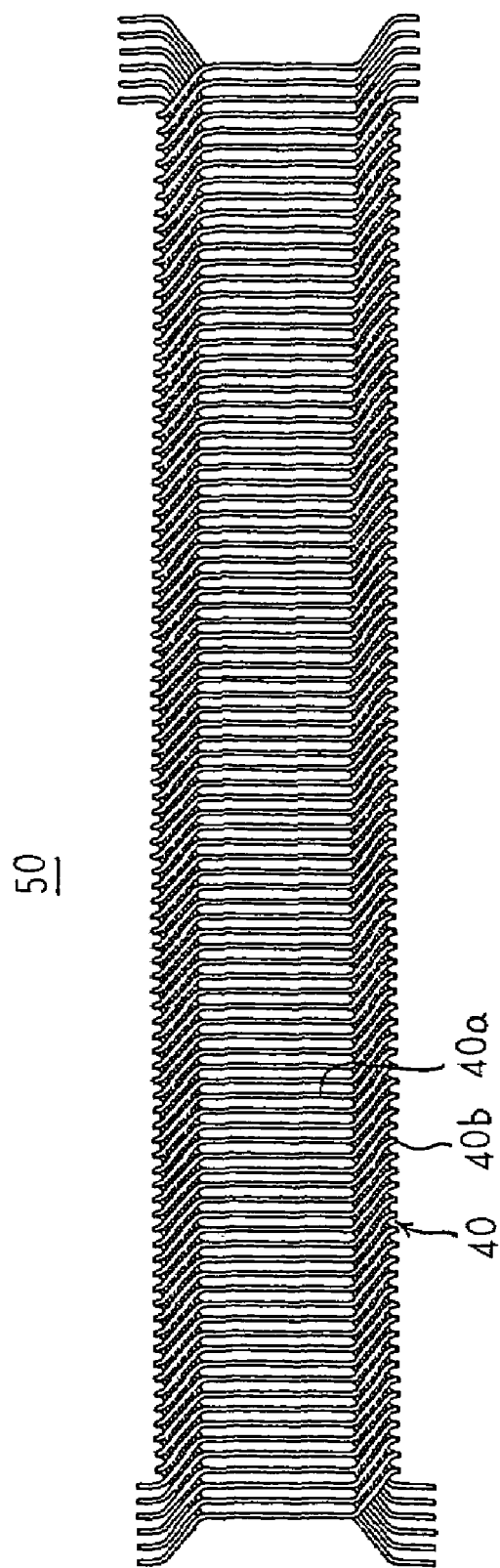
FIG. 4 is a plan explaining a winding assembly constituting part of the stator winding of the stator used in the rotary electric machine according to Embodiment 1 of the present invention.
Figure 5:
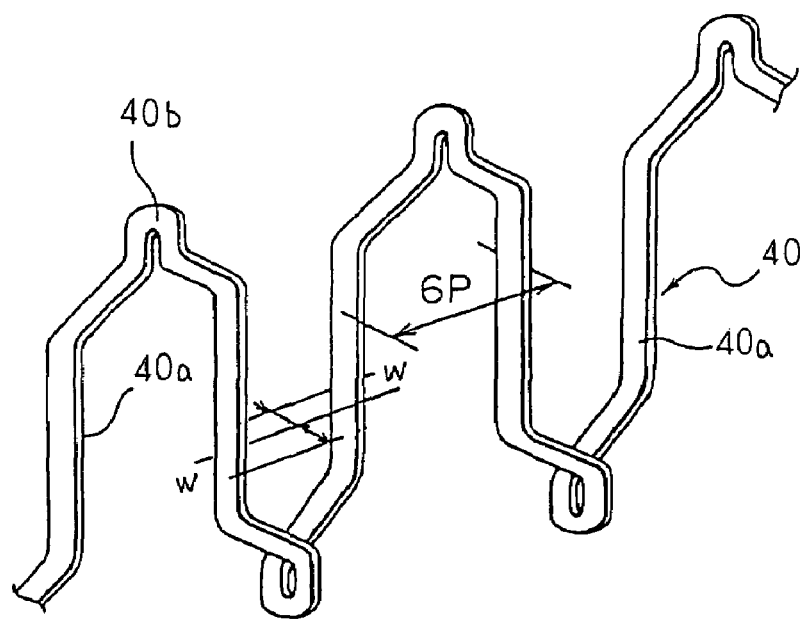
FIG. 5 is a partial perspective showing a continuous conductor wire constituting part of the winding assembly shown in FIG. 4.
Figure 6:
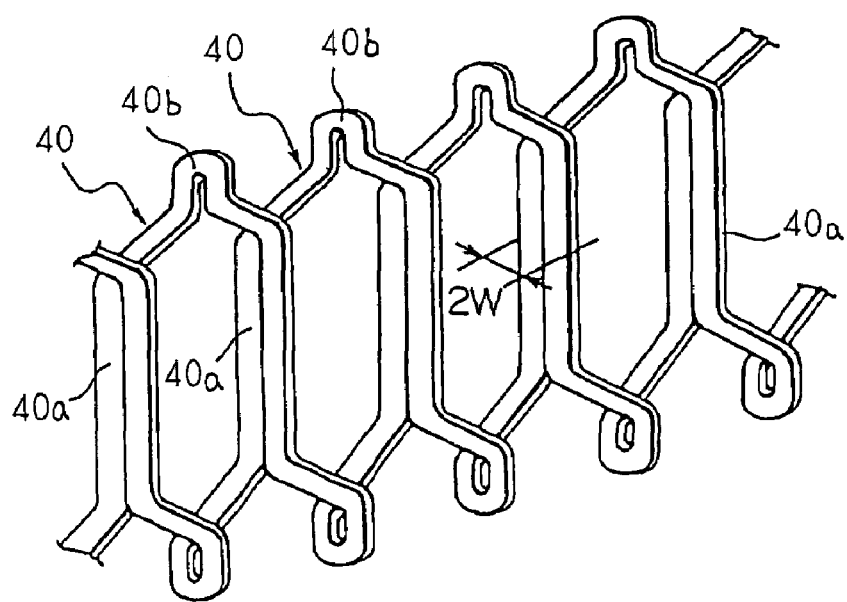
FIG. 6 is a partial perspective showing a pair of continuous conductor wires constituting part of the winding assembly shown in FIG. 4.
Figure 7:
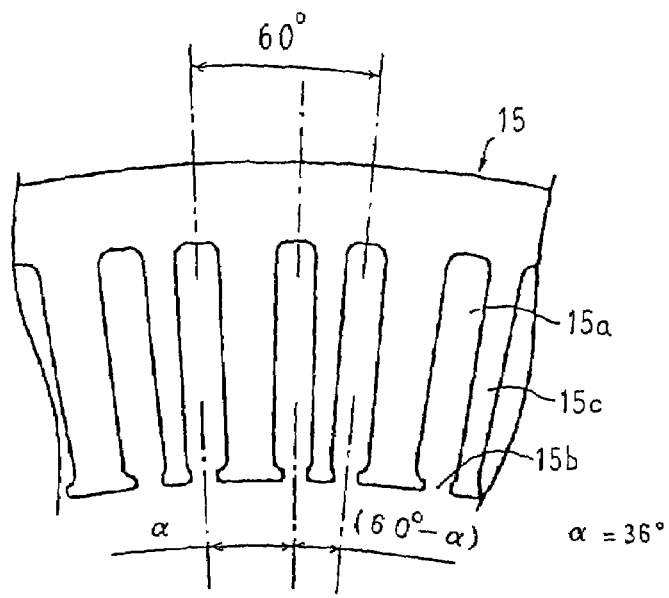
FIG. 7 is an end elevation showing part of a stator core used in the rotary electric machine according to Embodiment 1 of the present invention.
Figure 8:
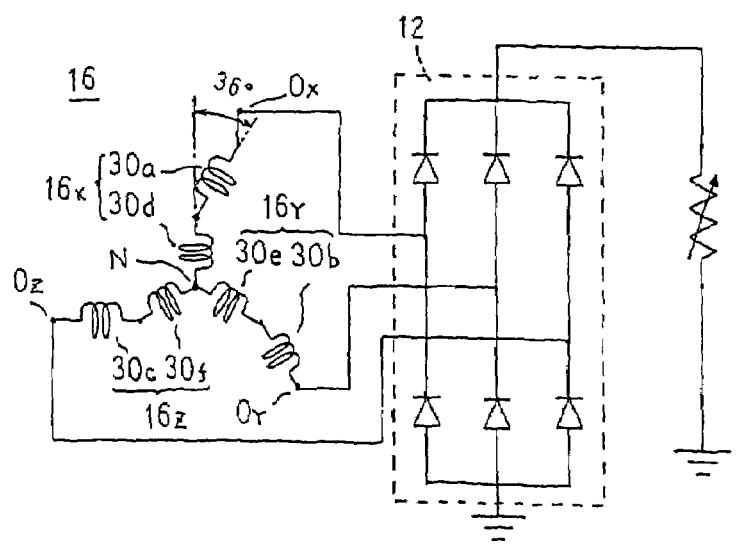
FIG. 8 is a circuit diagram showing an electrical circuit in the rotary electric machine according to Embodiment 1 of the present invention.

Next, a specific configuration of the stator 8 will be explained with reference to FIGS. 2 to 8. Here, FIG. 2 is a perspective showing a stator used in the rotary electric machine according to Embodiment 1 of the present invention, FIG. 3 is a rear-end end elevation schematically showing a first single-phase winding phase portion of a stator winding in the stator used in the rotary electric machine according to Embodiment 1 of the present invention, FIG. 4 is a plan explaining a winding assembly constituting part of the stator winding of the stator used in the rotary electric machine according to Embodiment 1 of the present invention, FIG. 5 is a partial perspective showing a continuous conductor wire constituting part of the winding assembly shown in FIG. 4, FIG. 6 is a partial perspective showing a pair of continuous conductor wires constituting part of the winding assembly shown in FIG. 4, FIG. 7 is an end elevation showing part of a stator core used in the rotary electric machine according to Embodiment 1 of the present invention, and FIG. 8 is a circuit diagram showing an electrical circuit in the rotary electric machine according to Embodiment 1 of the present invention. Moreover, in FIG. 3, solid lines indicate rear-end wiring, broken lines indicate front-end wiring, and black circles indicate joint portions.

The stator 8 is constituted by: a cylindrical stator core 15 composed of a laminated body of magnetic plates; and a three-phase stator winding 16 installed in the stator core 15.

Ninety-six slots 15a opening onto an inner circumferential side are formed in the stator core 15 in a circumferential direction. The slots 15a, as shown in FIG. 7, are formed at a nonuniform pitch by varying the circumferential width of teeth 15c such that distances between center lines of slot opening portions 15b alternate between an electrical angle of a and (60°–α). Here, α equals 36 degrees (α=36°). In other words, slots 15a are formed at a ratio of two slots per phase per pole at a nonuniform pitch alternating between an electrical angle of 36 degrees (36°) and 24 degrees (24°). Moreover, the center lines are straight lines each joining a circumferential center of a slot opening portion 15b and the central axis of the stator core 15 in a plane perpendicular to the central axis of the stator core 15.

Next, a construction of the three-phase stator winding 16 will be explained.

First, a construction of a single winding phase sub-portion constituting the three-phase stator winding 16 will be explained with reference to FIG. 3. Here, to facilitate explanation, housing positions of conductor wires 40 inside the slots 15a will be designated Address 1, Address 2, etc., through Address 6, respectively, from an inner circumferential side.

An a-phase winding phase sub-portion 30a is constituted by first to sixth wave winding sub-portions 41 to 46 each composed of one conductor wire 40 composed of a continuous copper wire having a rectangular cross section coated with an electrical insulator. The first wave winding sub-portion 41 is constructed by wave winding one conductor wire 40 so as to alternately occupy Address 1 and Address 2 in every sixth slot 15a from Slot Numbers 1 to 91. The second wave winding sub-portion 42 is constructed by wave winding one conductor wire 40 so as to alternately occupy Address 2 and Address 1 in every sixth slot 15a from Slot Numbers 1 to 91. The third wave winding sub-portion 43 is constructed by wave winding one conductor wire 40 so as to alternately occupy Address 3 and Address 4 in every sixth slot 15a from Slot Numbers 1 to 91. The fourth wave winding sub-portion 44 is constructed by wave winding one conductor wire 40 so as to alternately occupy Address 4 and Address 3 in every sixth slot 15a from Slot Numbers 1 to 91. The fifth wave winding sub-portion 45 is constructed by wave winding one conductor wire 40 so as to alternately occupy Address 5 and Address 6 in every sixth slot 15a from Slot Numbers 1 to 91. The sixth wave winding sub-portion 46 is constructed by wave winding one conductor wire 40 so as to alternately occupy Address 6 and Address 5 in every sixth slot 15a from Slot Numbers 1 to 91. In each of the slots 15a, six conductor wires 40 are arranged so as to line up in one column in a radial direction with longitudinal axes of their rectangular cross sections aligned radially.

Moreover, the first to sixth wave winding sub-portions 41 to 46 are each formed into single-turn wave windings by joining together first and second ends of the conductor wires 40 by tungsten-arc inert gas-shielded (TIG) welding. The second wave winding sub-portion 42, the fourth wave winding sub-portion 44, and the sixth wave winding sub-portion 46 are offset by an electrical angle of 180 degrees (180°) so as to be inversely wound relative to the first wave winding sub-portion 41, the third wave winding sub-portion 43, and the fifth wave winding sub-portion 45, respectively.

At the rear end of the stator core 15, portions of the conductor wires 40 of the first, third, and fifth wave winding sub-portions 41, 43, and 45 projecting outward from Slot Number 91 and Slot Number 1 of the slots 15a are cut, and portions of the conductor wires 40 of the second, fourth, and sixth wave winding sub-portions 42, 44, and 46 projecting outward from Slot Number 1 and Slot Number 7 of the slots 15a are cut. Next, the cut end of the third wave winding sub-portion 43 projecting outward from Address 4 of Slot Number 91 of the slots 15a, and the cut end of the first wave winding sub-portion 41 projecting outward from Address 1 of Slot Number 1 of the slots 15a are joined together by TIG welding. The cut end of the fifth wave winding sub-portion 45 projecting outward from Address 6 of Slot Number 91 of the slots 15a, and the cut end of the third wave winding sub-portion 43 projecting outward from Address 3 of Slot Number 1 of the slots 15a are joined together by TIG welding. The cut end of the fourth wave winding sub-portion 44 projecting outward from Address 4 of Slot Number 1 of the slots 15a, and the cut end of the second wave winding sub-portion 42 projecting outward from Address 1 of Slot Number 7 of the slots 15a are joined together by TIG welding. The cut end of the sixth wave winding sub-portion 46 projecting outward from Address 6 of Slot Number 1 of the slots 15a, and the cut end of the fourth wave winding sub-portion 44 projecting outward from Address 3 of Slot Number 7 of the slots 15a are joined together by TIG welding. And the cut end of the first wave winding sub-portion 41 projecting outward from Address 2 of Slot Number 91 of the slots 15a, and the cut end of the second wave winding sub-portion 42 projecting outward from Address 2 of Slot Number 1 of the slots 15a are joined together by TIG welding. Thus, a six-turn wave winding (the a-phase winding phase sub-portion 30a) is formed, in which the first to sixth wave winding sub-portions 41 to 46 are connected in series. The cut end of the fifth wave winding sub-portion 45 projecting outward from Address 5 of Slot Number 1 of the slots 15a and the cut end of the sixth wave winding sub-portion 46 projecting outward from Address 5 of Slot Number 7 of the slots 15a become first and second end portions of the a-phase winding phase sub-portion 30a.

Although not shown, a d-phase winding phase sub-portion 30d, a c-phase winding phase sub-portion 30c, an f-phase winding phase sub-portion 30f, a b-phase winding phase sub-portion 30b, and an e-phase winding phase sub-portion 30e are formed in a similar manner such that the slot groups into which the conductor wires 40 of each winding phase sub-portion are installed are successively offset by one slot from each other. The a-phase winding phase sub-portion 30a is installed in a first slot group including Slot Numbers 1, 7, etc., through 91, the d-phase winding phase sub-portion 30d is installed in a second slot group including Slot Numbers 2, 8, etc., through 92, the c-phase winding phase sub-portion 30c is installed in a third slot group including Slot Numbers 3, 9, etc., through 93, the f-phase winding phase sub-portion 30f is installed in a fourth slot group including Slot Numbers 4, 10, etc., through 94, the b-phase winding phase sub-portion 30b is installed in a fifth slot group including Slot Numbers 5, 11, etc., through 95, and the e-phase winding phase sub-portion 30e is installed in a sixth slot group including Slot Numbers 6, 12, etc., through 96. The d-phase winding phase sub-portion 30d, the e-phase winding phase sub-portion 30e, and the f-phase winding phase sub-portion 30f have a phase difference corresponding to an electrical angle of 36 degrees (36°) relative to the a-phase winding phase sub-portion 30a, the b-phase winding phase sub-portion 30b, and the c-phase winding phase sub-portion 30c, respectively.

Here, the cut end of the fifth wave winding sub-portion 45 projecting outward from Address 5 of Slot Number 2 of the slots 15a and the cut end of the sixth wave winding sub-portion 46 projecting outward from Address 5 of Slot Number 8 of the slots 15a become first and second end portions of the d-phase winding phase sub-portion 30d. The cut end of the fifth wave winding sub-portion 45 projecting outward from Address 5 of Slot Number 11 of the slots 15a and the cut end of the sixth wave winding sub-portion 46 projecting outward from Address 5 of Slot Number 17 of the slots 15a become first and second end portions of the b-phase winding phase sub-portion 30b. The cut end of the fifth wave winding sub-portion 45 projecting outward from Address 5 of Slot Number 12 of the slots 15a and the cut end of the sixth wave winding sub-portion 46 projecting outward from Address 5 of Slot Number 18 of the slots 15a become first and second end portions of the e-phase winding phase sub-portion 30e. The cut end of the fifth wave winding sub-portion 45 projecting outward from Address 5 of Slot Number 21 of the slots 15a and the cut end of the sixth wave winding sub-portion 46 projecting outward from Address 5 of Slot Number 27 of the slots 15a become first and second end portions of the c-phase winding phase sub-portion 30c. The cut end of the fifth wave winding sub-portion 45 projecting outward from Address 5 of Slot Number 22 of the slots 15a and the cut end of the sixth wave winding sub-portion 46 projecting outward from Address 5 of Slot Number 28 of the slots 15a become first and second end portions of the f-phase winding phase sub-portion 30f.

Next, as shown in FIG. 2, the cut end of the fifth wave winding sub-portion 45 projecting outward from Address 5 of Slot Number 2 of the slots 15a and the cut end of the sixth wave winding sub-portion 46 projecting outward from Address 5 of Slot Number 7 of the slots 15a are led around an upper portion of a rear-end coil end portion 16r, and the end portions are abutted and joined together by TIG welding, constituting a first joint portion $31_{a\text{-}d}$. Thus, an X-phase winding phase portion $16_X$ is formed, in which the a-phase winding phase sub-portion 30a and the d-phase winding phase sub-portion 30d are connected in series. In other words, the a-phase winding phase sub-portion 30a and the d-phase winding phase sub-portion 30d, respectively functioning as first and second stator winding phase sub-portions, are zigzag-connected at an electrical angle of 36 degrees (36°).

The cut end of the fifth wave winding sub-portion 45 projecting outward from Address 5 of Slot Number 12 of the slots 15a and the cut end of the sixth wave winding sub-portion 46 projecting outward from Address 5 of Slot Number 17 of the slots 15a are led around an upper portion of the rear-end coil end portion 16r, and the end portions are abutted and joined together by TIG welding, constituting a second joint portion $31_{b-e}$. Thus, a Y-phase winding phase portion $16_Y$ is formed, in which the b-phase winding phase sub-portion 30b and the e-phase winding phase sub-portion 30e are connected in series. In other words, the b-phase winding phase sub-portion 30b and the e-phase winding phase sub-portion 30e, respectively functioning as first and second stator winding phase sub-portions, are zigzag-connected at an electrical angle of 36 degrees (36°).

The cut end of the fifth wave winding sub-portion 45 projecting outward from Address 5 of Slot Number 22 of the slots 15a and the cut end of the sixth wave winding sub-portion 46 projecting outward from Address 5 of Slot Number 27 of the slots 15a are led around an upper portion of the rear-end coil end portion 16r, and the end portions are abutted and joined together by TIG welding, constituting a third joint portion $31_{c-f}$. Thus, a Z-phase winding phase portion $16_Z$ is formed, in which the c-phase winding phase sub-portion 30c and the f-phase winding phase sub-portion 30f are connected in series. In other words, the c-phase winding phase sub-portion 30c and the f-phase winding phase sub-portion 30f, respectively functioning as first and second stator winding phase sub-portions, are zigzag-connected at an electrical angle of 36 degrees (36°).

The cut end of the sixth wave winding sub-portion 46 projecting outward from Address 5 of Slot Number 8 of the slots 15a, the cut end of the sixth wave winding sub-portion 46 projecting outward from Address 5 of Slot Number 18 of the slots 15a, and the cut end of the sixth wave winding sub-portion 46 projecting outward from Address 5 of Slot Number 28 of the slots 15a are led around an upper portion of the rear-end coil end portion 16r, and the end portions are abutted and joined together by TIG welding, constituting a neutral point N. Thus, the three-phase stator winding 16 is obtained, which is composed of a three-phase alternating-current winding in which the X-phase winding phase portion $16_X$, the Y-phase winding phase portion $16_Y$, and the Z-phase winding phase portion $16_Z$ are Y-connected.

The cut end of the fifth wave winding sub-portion 45 projecting outward from Address 5 of Slot Number 1 of the slots 15a becomes an output wire $O_X$ of the X-phase winding phase portion $16_X$. The cut end of the fifth wave winding sub-portion 45 projecting outward from Address 5 of Slot Number 11 of the slots 15a becomes an output wire $O_Y$ of the Y-phase winding phase portion $16_Y$. The cut end of the fifth wave winding sub-portion 45 projecting outward from Address 5 of Slot Number 21 of the slots 15a becomes an output wire $O_Z$ of the Z-phase winding phase portion $16_Z$.

A stator 8 prepared in this manner is mounted to the rotary electric machine 100, and the output wires $O_X$, $O_Y$, and $O_Z$ are connected to a rectifier 12, constituting the electrical circuit shown in FIG. 8.

Now, the three-phase stator winding 16 can be constructed using a winding assembly 50 such as that shown in FIG. 4.

This winding assembly 50 is prepared by simultaneously folding twelve conductor wires 40 arranged parallel to each other at a pitch of one slot into a lightning shape on a common plane.

As shown in FIG. 5, each of the conductor wires 40 folded into the lightning shape is shaped by bending into a planar pattern in which straight slot-accommodated portions 40a joined by return portions 40b are arranged at a pitch of six slots (6P). Adjacent pairs of the slot-accommodated portions 40a are offset by the return portions 40b by a width (w) of the conductor wires 40.

Six pairs of conductor wires 40 in each of which two of the conductor wires 40 shaped by bending in this manner are offset by a pitch of six slots with slot-accommodated portions 40a stacked as shown in FIG. 6 are arranged so as to be offset by a pitch of one slot from each other to constitute the winding assembly 50.

Three winding assemblies 50 constructed in this manner are stacked in three layers and mounted to the stator core 15. Each of the conductor wires 40 is installed so as to alternately occupy an inner layer and an outer layer in a slot depth direction in the slots 15a in every sixth slot, constituting the first to sixth wave winding sub-portions 41 to 46 in FIG. 3. The a-phase winding phase sub-portion 30a, the b-phase winding phase sub-portion 30b, the c-phase winding phase sub-portion 30c, the d-phase winding phase sub-portion 30d, the e-phase winding phase sub-portion 30e, and the f-phase winding phase sub-portion 30f each composed of a six-turn wave winding in which the first to sixth wave winding sub-portions 41 to 46 are connected in series are constructed by making connections based on the connection method shown in FIG. 3. In addition, at the rear end of the stator core 15, the return portions 40b are arranged at a pitch of one slot in a circumferential direction so as to form three rows, constituting a rear-end coil end portion 16r. At the front end of the stator core 15, the return portions 40b are arranged at a pitch of one slot in a circumferential direction so as to form three rows, constituting a front-end coil end portion 16f.

Figure 9:
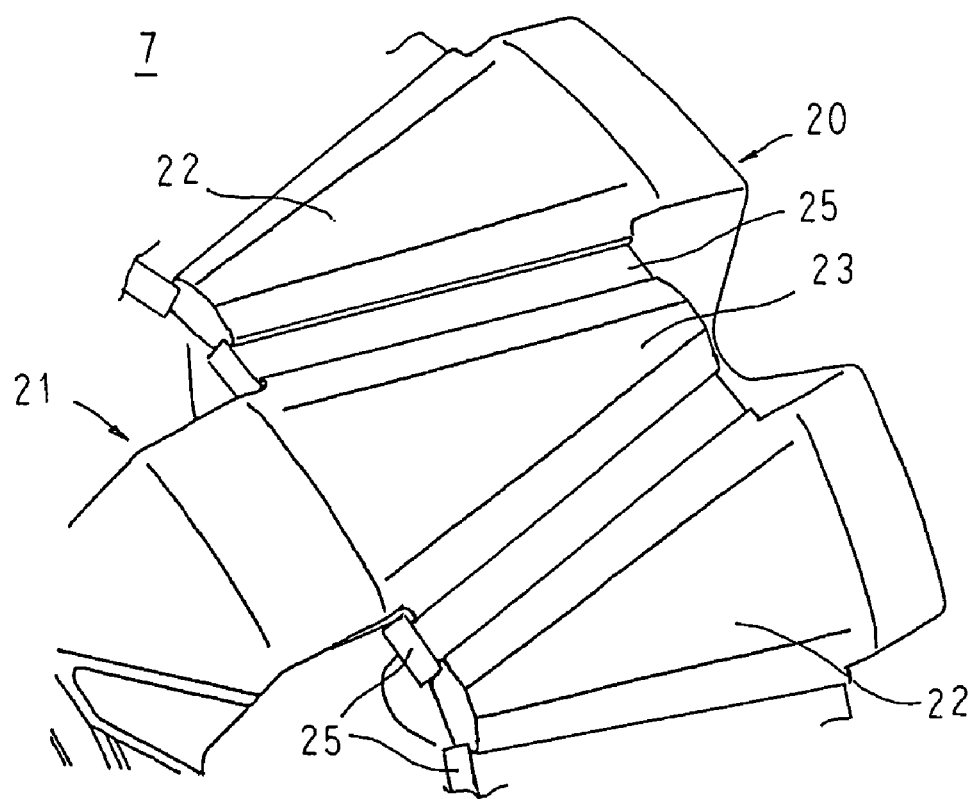
FIG. 9 is a perspective showing part of a rotor used in the rotary electric machine according to Embodiment 1 of the present invention.

Next, a specific configuration of the rotor 7 will be explained with reference to FIG. 9. Here, FIG. 9 is a perspective showing part of a rotor used in the rotary electric machine according to Embodiment 1 of the present invention.

In the rotor 7, claw-shaped magnetic poles 22 and 23 are constituted by a solid body of magnetic material, and generally rectangular parallelepipedic permanent magnets 25 magnetized in a direction that decreases leakage of magnetic flux between these claw-shaped magnetic poles 22 and 23 are fixed between the claw-shaped magnetic poles 22 and 23. Improvements in output are achieved by increasing the effective magnetic flux interacting with the stator 8 by means of these permanent magnets 25.

Next, the action and effects of Embodiment 1 will be explained.

Harmonics generated by the stator core 15 having slots 15a formed at a ratio of two slots per phase per pole and the stator 8 having a three-phase stator winding 16 in which three phases are zigzag-connected are categorized into stator magnetomotive force harmonics and slot harmonics, and the magnetomotive force harmonics can be calculated theoretically. The slot harmonics vary depending on the size of a circumferential width (a slot opening portion width) of slot opening portions 15b, but since the ratio of the slot opening portion width to slot pitch is generally ½ to ⅕, the magnitude of the slot harmonics can also be calculated theoretically.

However, rotor surface loss is not determined by the magnitude of the harmonics alone. More specifically, for the harmonics contributing to rotor surface loss, it is necessary to discuss not only the magnitude of the generated harmonics but also the magnitude of these harmonics interacting with the rotor 7 across the air gap. For that purpose, it is necessary to estimate the amount of each of the spatial harmonics reaching the rotor surface through the air gap. Here, "air gap" means a gap between an outer circumferential surface of the rotor 7 and an inner circumferential surface of the stator core 15.

"Spatial harmonic order" means the length of one period of harmonic pitch in the air gap, "fifth-order harmonics" meaning a pitch having a length of ⅕ of one period (two poles) of the fundamental. In other words, the pitch of the nth-order spatial harmonic order is 1/n.

In order to estimate the amount of each of the above harmonics that reach the rotor surface, the present applicants performed detailed analyses of electromagnetic fields, and calculated the harmonic attenuation factor relative to air gap length/harmonic pitch. The results of these analyses of the electromagnetic fields are shown in FIG. 10.

Figure 10:
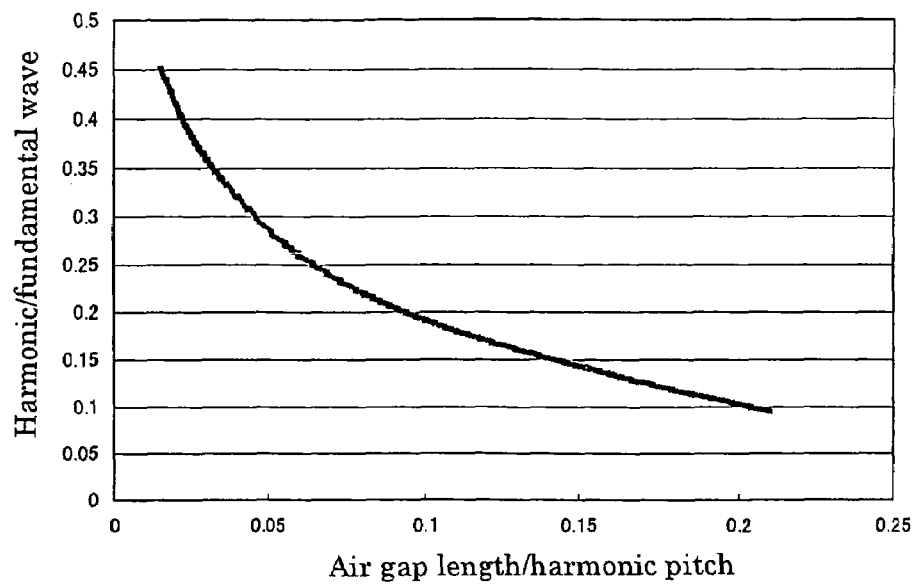
FIG. 10 is a graph showing harmonic attenuation factor relative to air gap length/harmonic pitch.

From FIG. 10, it can be seen that the greater the air gap length/harmonic pitch, the more reduced the harmonic magnetic flux reaching the rotor surface.

Figure 11:
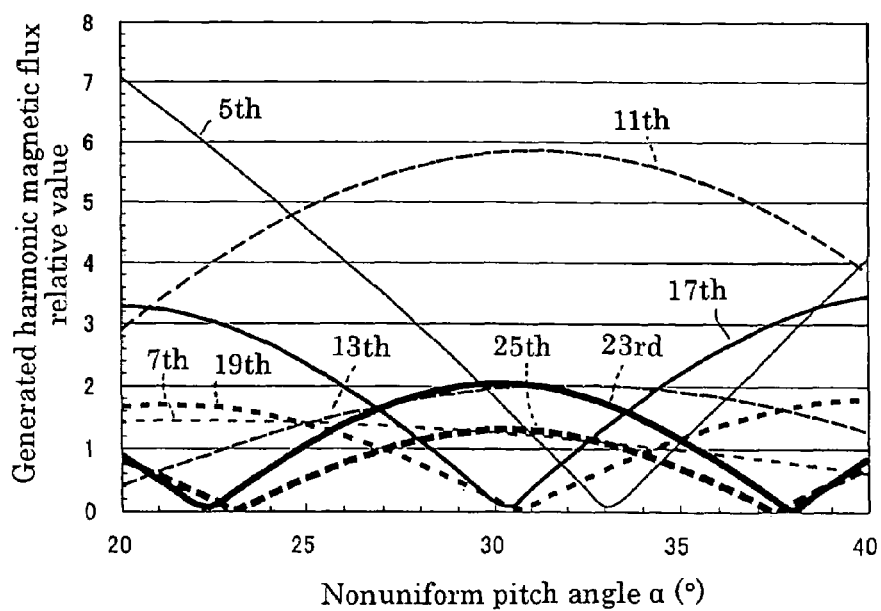
FIG. 11 is a graph showing relationships between generated harmonic magnetic flux relative value and nonuniform pitch angle.
Figure 12:
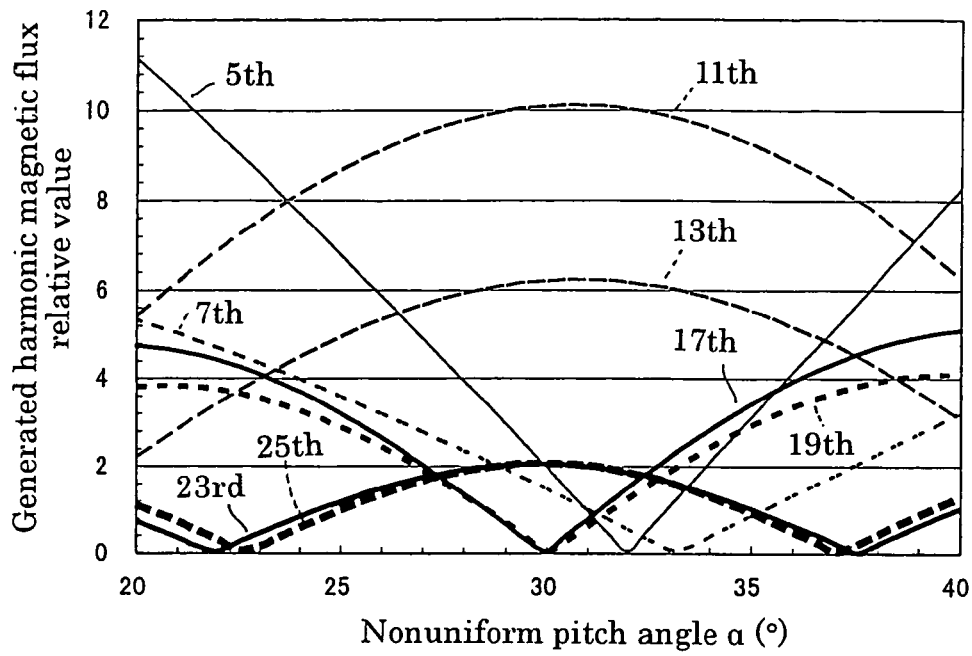
FIG. 12 is a graph showing relationships between generated harmonic magnetic flux relative value and nonuniform pitch angle.

Results when the magnitude of each harmonic at the rotor surface was calculated relative to the slot opening portion pitch angle (the spacing between the center lines of the slot opening portions) while considering the attenuation factor obtained from the results of these analyses of the electromagnetic fields are shown in FIGS. 11 and 12.

Moreover, FIG. 11 is a case using a stator core in which the ratio of tooth tip end width to slot opening portion width is 2:1 (a case in which the influence of the slot harmonics is small), and FIG. 12 is a case using a stator core in which the ratio of tooth tip end width to slot opening portion width is 3:1 (a case in which the influence of the slot harmonics is large). Moreover, stator cores are generally manufactured such that the ratio of tooth tip end width to slot opening portion width is in a range from greater than or equal to or 2 to less than or equal to 3 (2≦(tooth tip end width/slot opening portion width)≦3).

In FIGS. 11 and 12, the eleventh and thirteenth harmonics are large because those are harmonic orders at which the magnetomotive force harmonics and the slot harmonics are superposed.

The rotor surface loss cannot be investigated by the magnitudes of the harmonics shown in FIGS. 11 and 12 alone. That is because loss occurs in proportion to the square of the eddy currents generated by these harmonics.

Now, if, as in the rotor 7, the magnetic poles are constituted by a solid body of magnetic material (hereinafter called "a solid rotor"), since the eddy currents can be considered to be generally proportional to the magnetic flux density, the magnitude of the eddy current loss due to the harmonics can be considered to be proportional to the square of the magnitudes of the harmonics. If the magnetic poles of a rotor is constructed by laminating and integrating magnetic steel sheets (hereinafter called "a laminated rotor"), the eddy currents can be considered to be generally proportional to the product of the square of the frequency and the square of the magnetic flux density. In other words, the loss may also be considered to be between the square of the magnitudes of the harmonics and the square of ((the magnitudes of the harmonics)×(the frequency)) irrespective of the material of the rotor 7.

Now, the frequencies of the fifth-order and seventh-order harmonics are frequencies that are six times the fundamental wave in the rotor coordinate system, and similarly, the eleventh-order and thirteenth-order harmonics are twelve times, the seventeenth-order and nineteenth-order harmonics are eighteen times, and the twenty-third-order and twenty-fifth-order harmonics are frequencies that are twenty-four times.

Figure 13:
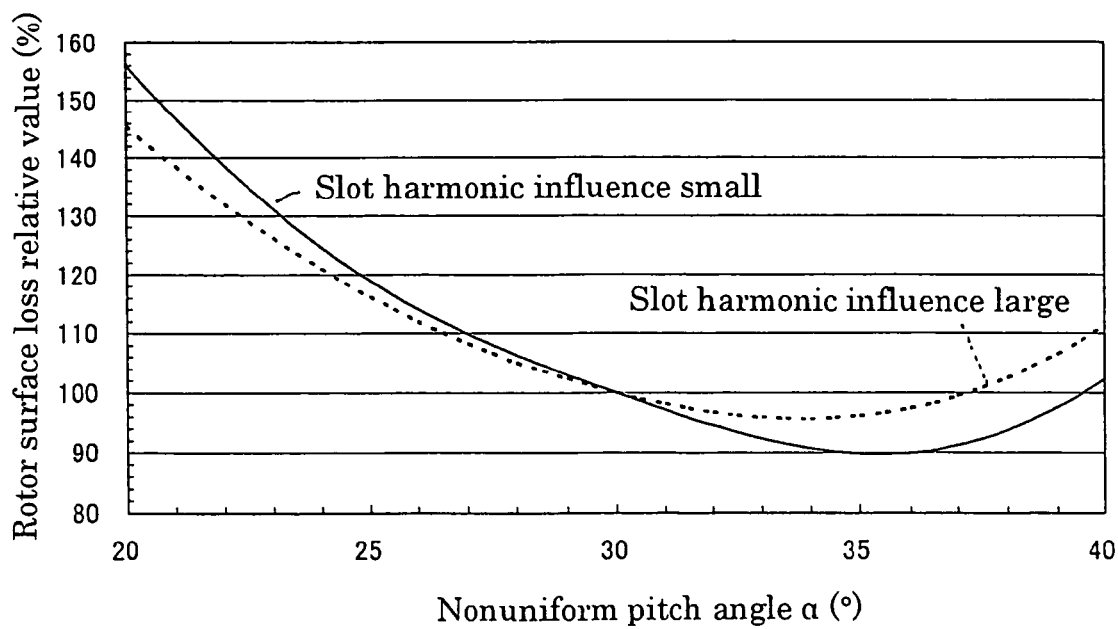
FIG. 13 is a graph showing relationships between rotor surface loss relative value and nonuniform pitch angle in a solid rotor.
Figure 14:
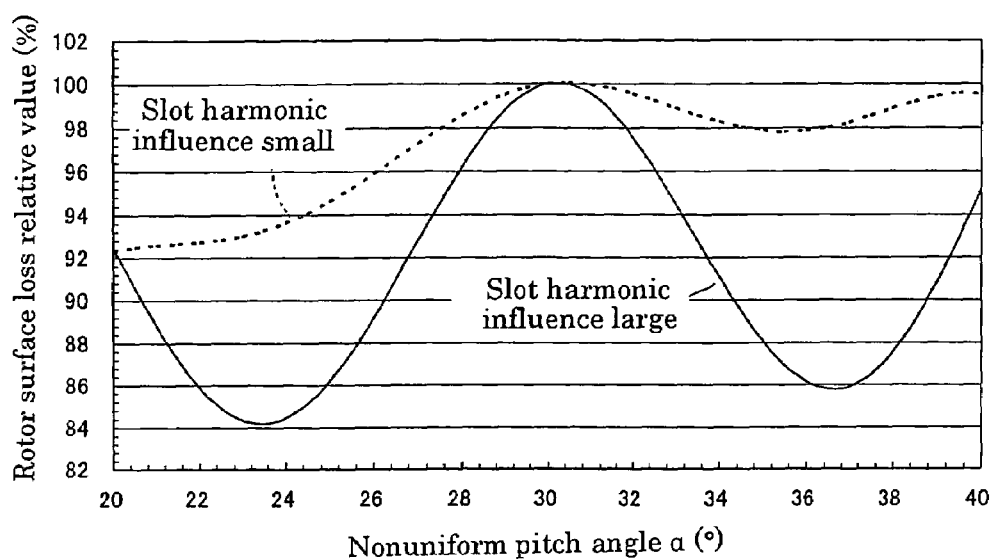
FIG. 14 is a graph showing relationships between rotor surface loss relative value and nonuniform pitch angle in a laminated rotor.

Considering these frequencies, the ratio of rotor surface loss in a nonuniform pitch stator relative to rotor surface loss in uniform pitch slots of α=30 degrees (30°) is shown in FIGS. 13 and 14 expressed as graphs. Here, FIG. 13 models a solid rotor proportional to the square of the magnitudes of the harmonics, and FIG. 14 models a laminated rotor.

From FIG. 13, it can be seen that in a solid rotor, the rotor surface loss when a nonuniform pitch angle α is within a range from greater than 30 degrees to less than or equal to 37 degrees (30°<α≦37°) is less than the rotor surface loss with a uniform pitch angle of 30 degrees (30°).

From FIG. 14, it can be seen that in a laminated rotor, the rotor surface loss is greatest with a at a uniform pitch of 30 degrees (30°), and that rotor surface loss is reduced if α is set to greater than 30 degrees (30°) or set to less than 30 degrees (30°).

To summarize the above, in the case of a solid rotor, a rotary electric machine having high efficiency and high reliability can be achieved if the nonuniform pitch angle a of stator slots provided with a three-phase zigzag winding with two slots per phase per pole is within a range from greater than 30 degrees to less than or equal to 37 degrees (30°<α≦37°), since the rotor surface loss due to harmonics is reduced.

On the other hand, in the case of a laminated rotor, a rotary electric machine having high efficiency and high reliability can be achieved if the pitch of stator slots provided with a three-phase zigzag winding with two slots per phase per pole is nonuniform (α≠30°), since the rotor surface loss due to harmonics is reduced. Moreover, from FIG. 14, it is preferable that the nonuniform pitch angle α be made greater than or equal to 20 degrees and less than or equal to 28 degrees (20°≦α≦28°) or greater than or equal to 32 degrees and less than or equal to 38 degrees (32°≦α≦38°).

Next, harmonic components of the induced voltage generated in the three-phase stator winding 16 by the permanent magnets 25 when the field magnetomotive force from the field winding 13 is 0 (when the field current is 0) will be investigated.

The harmonic magnetomotive force from the permanent magnets 25, generally only occurs when the harmonic order is an odd-numbered order, and thus the induced voltage generated in the three-phase stator winding 16 for a three-phase winding in which the number of slots per phase per pole is one (1) is expressed by the following expressions:

Phase voltage $V_{p1}$ (for a delta connection)

$$V_{p1} = A \cos(n\omega t) \qquad (1)$$

Line voltage $V_{l1}$ (for a Y connection)

$$V_{l1} = -2A \sin(60n)\sin(n\omega t - 60n) \qquad (2)$$

where n is the harmonic order, ω is the angular frequency of the fundamental wave, A is amplitude, and t is time.

On the other hand, if the number of slots per phase per pole is two (2), and α is a nonuniform pitch angle, the expressions are as follows:

Phase voltage $V_{p1}$ (for a delta connection)

$$V_{p1} = A\cos(n\alpha/2)\cos\{n\omega t - (n\alpha/2)\} \quad (3)$$

Line voltage $V_{l1}$ (for a Y connection)

$$V_{l1} = -2A\cos(n\alpha/2)\sin(60n)\sin\{n\omega t - (n\alpha/2) - 60n\} \quad (4)$$

Figure 15:
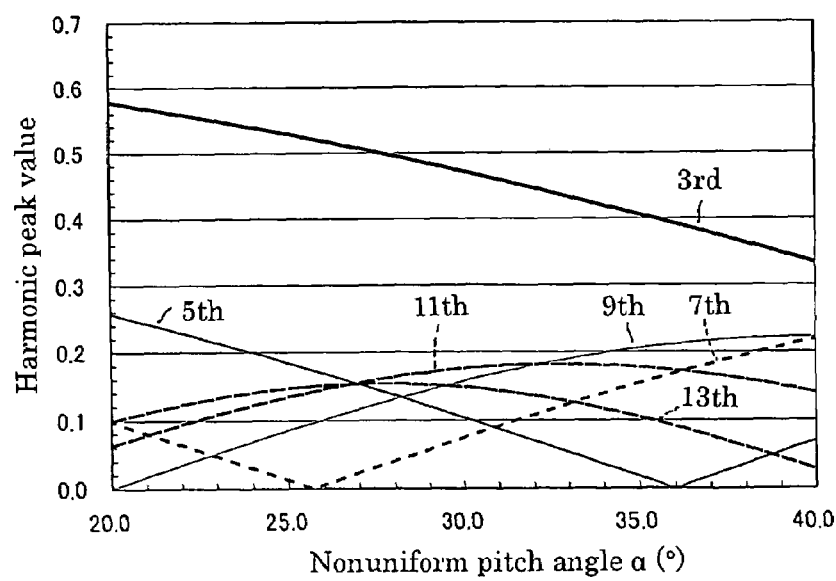
FIG. 15 is a graph showing relationships between de-energized phase induced voltage percentage harmonic content and nonuniform pitch angle.
Figure 16:
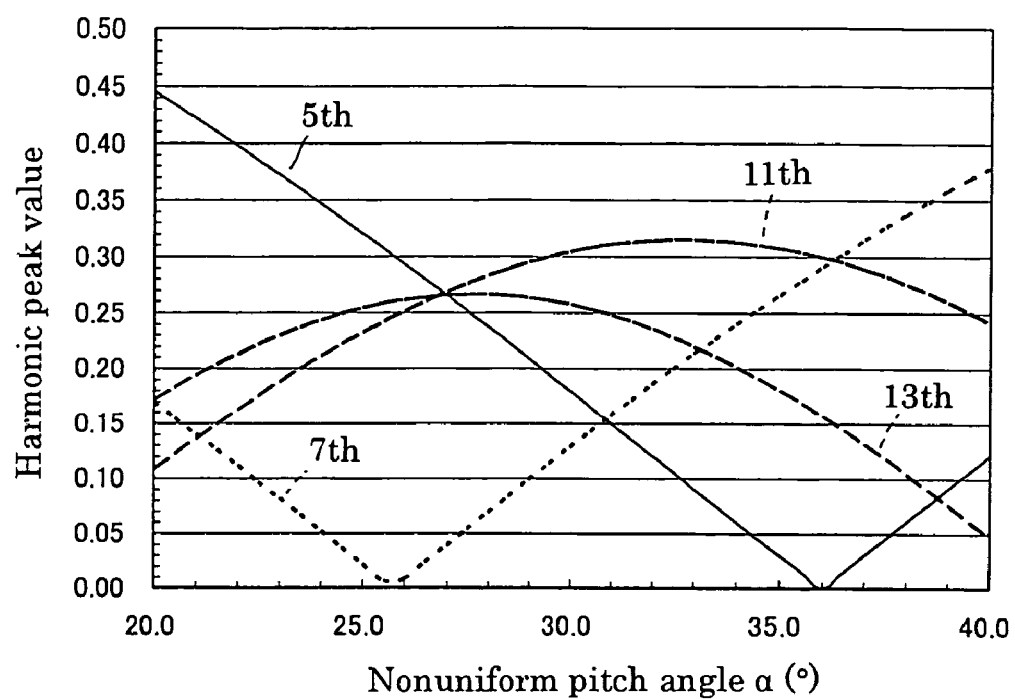
FIG. 16 is a graph showing relationships between de-energized inter-wire induced voltage percentage harmonic content and nonuniform pitch angle.

Results when peak values of the harmonic components sought using the above Expressions (3) and (4) were expressed as graphs relative to the nonuniform pitch angle a are shown in FIGS. 15 and 16. Moreover, FIG. 15 shows relationships between phase voltage and the nonuniform pitch angle α, and FIG. 16 shows relationships between line voltage and the nonuniform pitch angle α. However, the magnitude of each harmonic is based on the assumption that the amplitude of the fundamental wave of the phase induced voltage is two (2) and the amplitude of the nth-order harmonic is 1/n.

From FIG. 15 and FIG. 16, it can be seen that the fifth-order harmonic is minimized at a nonuniform pitch angle of 36 degrees (36°), and the seventh-order harmonic at 25.7 degrees (25.7°) (=180°/7), and that the eleventh-order and thirteenth-order harmonics are characterized by peaks in a vicinity of 30 degrees (30°). From these characteristics, it can be seen that the induced voltage harmonics can be reduced by making the pitch nonuniform rather than a uniform pitch of 30 degrees (30°).

According to Embodiment 1, because α is set to 36 degrees (36°), a rotary electric machine having high efficiency and high reliability can be achieved, since the rotor surface loss due to harmonics is reduced and the permanent magnets 25 mounted between the claw-shaped magnetic poles 22 and 23 will not demagnetize and lead to a decline in output, since heat generation due to rotor surface loss is reduced. Furthermore, even in a field de-energized state, since harmonic components of the induced voltage generated by permanent-magnet magnetomotive force while the rotor 7 is rotating at high speed are reduced, they will not exceed a power supply voltage or an element breakdown voltage.

Furthermore, the X-phase winding phase portion $16_X$, the Y-phase winding phase portion $16_Y$, and the Z-phase winding phase portion $16_Z$ are each constructed by connecting in series pairs of winding phase sub-portions having a phase difference corresponding to an electrical angle of 36 degrees (36°). Thus, because the pairs of winding phase sub-portions are connected in series between adjacent slots 15a having an electrical angle of 36 degrees (36°), spatial and temporal harmonics of the stator 8 can be reduced, making it low in electromagnetic noise and low in vibration. Furthermore, another effect is that connection space for connecting the pairs of winding phase sub-portions in series is widened, thereby improving workability when making the series connections.

Because the rotor 7 is a solid rotor, the rotor can be prepared inexpensively.

Because the permanent magnets 25 are interposed between the claw-shaped magnetic poles 22 and 23, leakage of magnetic flux between the claw-shaped magnetic poles 22 and 23 is reduced. Thus, the effective magnetic flux interacting with the stator 8 is increased, enabling improvements in output. In addition, because the permanent magnets 25 are placed in contact with the claw-shaped magnetic poles 22 and 23, leakage of magnetic flux between the claw-shaped magnetic poles 22 and 23 is further reduced.

EMBODIMENT 2

Figure 17:
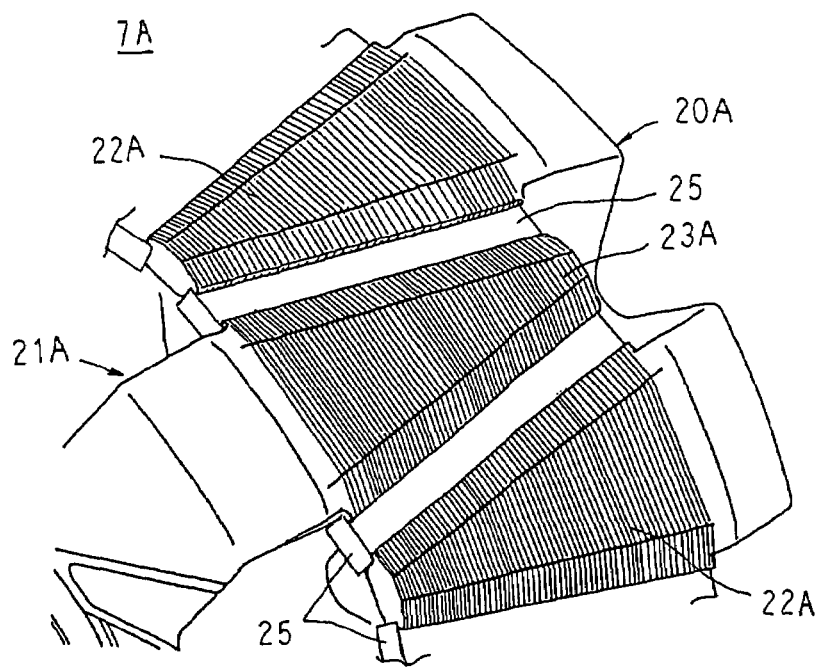
FIG. 17 is a perspective showing part of a rotor used in a rotary electric machine according to Embodiment 2 of the present invention.
Figure 18:
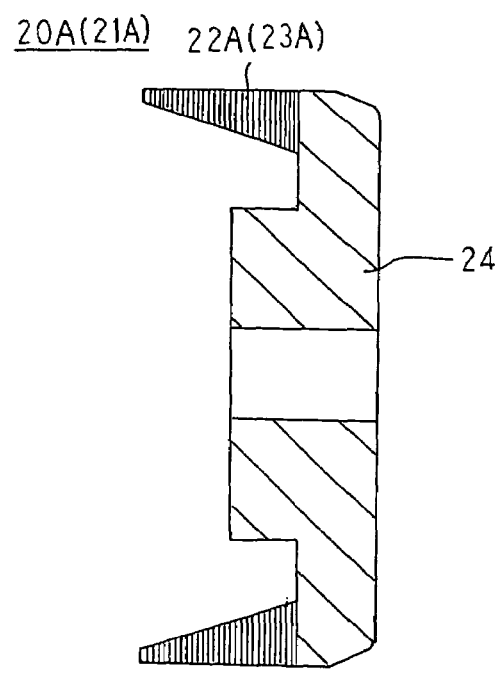
FIG. 18 is a cross section showing a pole core of the rotor used in the rotary electric machine according to Embodiment 2 of the present invention.

FIG. 17 is a perspective showing part of a rotor used in a rotary electric machine according to Embodiment 2 of the present invention, and FIG. 18 is a cross section showing a pole core of the rotor used in the rotary electric machine according to Embodiment 2 of the present invention.

In FIGS. 17 and 18, a rotor 7A is a laminated rotor in which only claw-shaped magnetic poles 22A and 23A of pole cores 20A and 21A are constructed by lamination. Axial end portions 24 of the pole core 20A and 21A are each made of a solid iron member as in Embodiment 1 above, and the claw-shaped magnetic poles 22A and 23A, which are constructed by laminating and integrating magnetic steel sheets, are bonded by welding to the axial end portions 24. Permanent magnets 25 are mounted between the claw-shaped magnetic poles 22A and 23A. Moreover, since claw-shaped magnetic poles 22A and 23A having a laminated construction are weak in mechanical strength, end portions of the permanent magnets 25 are also secured to the axial end portions 24 of the pole cores 20A and 21A.

Whereas in the stator in Embodiment 1 above, the X-phase winding phase portion $16_X$, the Y-phase winding phase portion $16_Y$, and the Z-phase winding phase portion $16_Z$ are each constructed by connecting in series pairs of winding sub-portions having a phase difference corresponding to an electrical angle of 36 degrees (36°), in Embodiment 2, the X-phase winding phase portion $16_X$, the Y-phase winding phase portion $16_Y$, and the Z-phase winding phase portion $16_Z$ are each constructed by connecting in series pairs of winding sub-portions having a phase difference corresponding to an electrical angle of 24 degrees (24°).

In a rotary electric machine constructed in this manner, because the rotor 7A is a laminated rotor, and the pairs of winding sub-portions constituting each of the X-phase winding phase portion $16_X$, the Y-phase winding phase portion $16_Y$, and the Z-phase winding phase portion $16_Z$ are each constructed so as to have a phase difference corresponding to an electrical angle of 24 degrees (24°), as can be seen from FIG. 14, rotor surface loss is less than that of conventional constructions in which the uniform pitch angle is 30 degrees (30°). Consequently, since heat generation due to rotor surface loss is reduced, the permanent magnets 25 mounted between the claw-shaped magnetic poles 22A and 23A will not demagnetize and lead to a decline in output. Furthermore, since the claw-shaped magnetic poles 22A and 23A are constructed by laminating magnetic steel sheets, heat is less likely to transfer to the permanent magnets 24 from the claw-shaped magnetic poles 22A and 23A, making suppression of demagnetization of the permanent magnets 25 even more effective.

As shown in FIG. 16, since pairs of winding phase portions having a phase difference corresponding to an electrical angle of 24 degrees (24°), which is in close proximity to a local minimum of the seventh-order harmonic at 25.7 degrees (25.7°), are connected in series, it can be seen that the induced voltage harmonics are reduced unlike conventional constructions in which the uniform pitch angle is 30 degrees (30°). Consequently, even in a field de-energized state, since harmonic components of the induced voltage generated by permanent-magnet magnetomotive force while the rotor 7A is rotating at high speed are reduced, they will not exceed a power supply voltage or an element breakdown voltage.

EMBODIMENT 3

Figure 19:
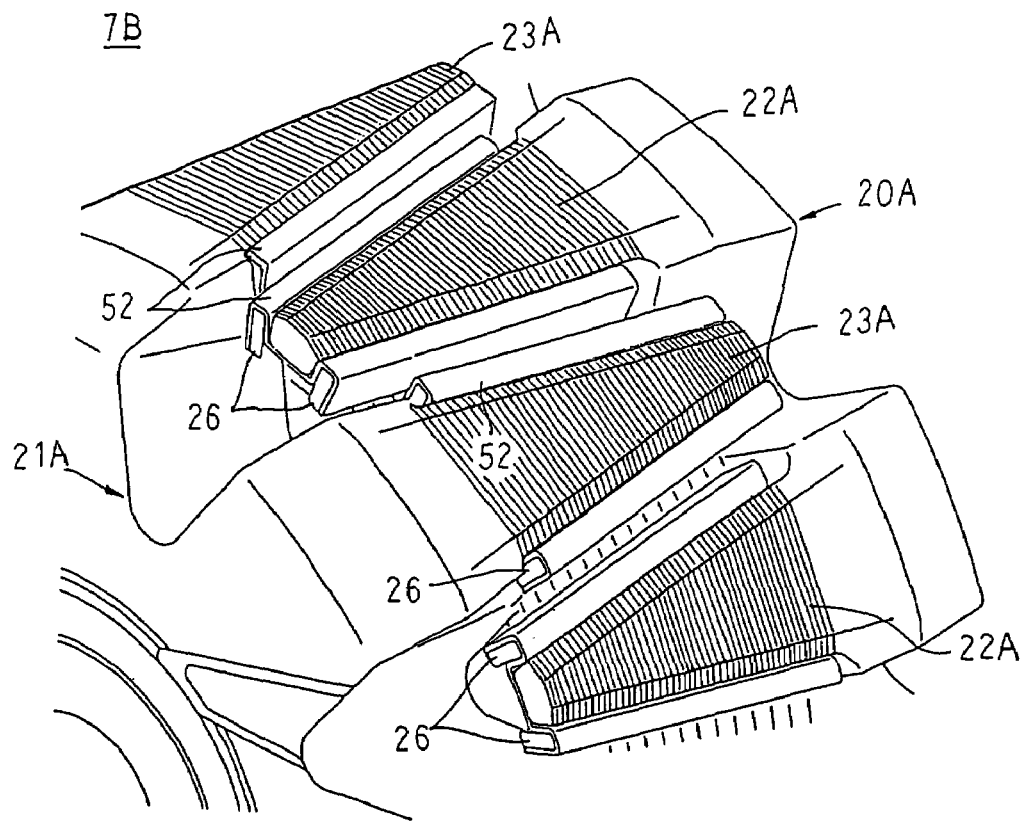
FIG. 19 is a partial perspective showing a rotor used in a rotary electric machine according to Embodiment 3 of the present invention.
Figure 20:
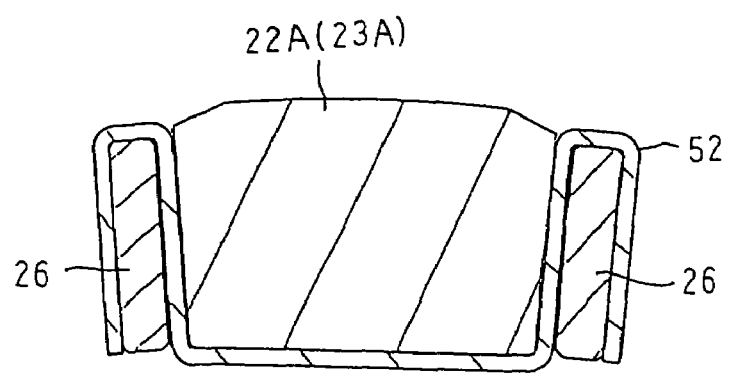
FIG. 20 is a cross section showing a pole core of the rotor used in the rotary electric machine according to Embodiment 3 of the present invention.

FIG. 19 is a partial perspective showing a rotor used in a rotary electric machine according to Embodiment 3 of the present invention, and FIG. 20 is a cross section showing a pole core of the rotor used in the rotary electric machine according to Embodiment 3 of the present invention.

In FIG. 19, a rotor 7B is a laminated rotor, and permanent magnets 26 are each disposed on each of two side surfaces of claw-shaped magnetic poles 22A and 23A. These permanent magnets 26 are supported by the claw-shaped magnetic poles 22A and 23A through reinforcing bodies 52 that absorb centrifugal forces acting on the permanent magnets 26 during rotation of the rotor 7B so as to be inclined such that outer circumferential sides spread away from each other. The reinforcing bodies 52 are made of plates of a metal such as stainless steel, etc., having a thickness of approximately 0.5 mm, and are formed by bending a single piece of metal plate by pressing.

As shown in FIG. 20, a cross section of these reinforcing bodies 52 perpendicular to an axial direction of the rotor 7B is a general M shape, being joined to an inner circumferential surface of the claw-shaped magnetic poles 22A and 23A by a shape following the inner circumferential surface of the claw-shaped magnetic poles 22A and 23A. The permanent magnets 26 are fixed to two angular C-shaped wing portions of the M-shaped reinforcing bodies 52, being placed in contact with side surfaces of the claw-shaped magnetic poles 22A and 23A by means of the reinforcing bodies 52 by elasticity of the reinforcing bodies 52.

By adopting a construction of this kind, even if the claw-shaped magnetic poles 22A and 23A are spread radially-outward by centrifugal force during high-speed rotation of the rotor 7B, pairs of the claw-shaped magnetic poles 22A and 23A will each simply be displaced without large stresses being generated in the permanent magnets 26, thereby preventing breakage.

Although not shown, slots are formed in the stator core at a ratio of two slots per phase per pole at a nonuniform pitch alternating between an electrical angle of 32.5 degrees (32.5°) and 27.5 degrees (27.5°). Furthermore, the X-phase winding phase portion $16_X$, the Y-phase winding phase portion $16_Y$, and the Z-phase winding phase portion $16_Z$ are each constructed by connecting in series pairs of winding sub-portions having a phase difference corresponding to an electrical angle of 27.5 degrees (27.5°).

In a rotary electric machine constructed in this manner, because the rotor 7B is a laminated rotor, and the pairs of winding sub-portions constituting each of the X-phase winding phase portion $16_X$, the Y-phase winding phase portion $16_Y$, and the Z-phase winding phase portion $16_Z$ are each constructed so as to have a phase difference corresponding to an electrical angle of 27.5 degrees (27.5°), as can be seen from FIG. 14, rotor surface loss is less than that of conventional constructions in which the uniform pitch angle is 30 degrees (30°). Consequently, since heat generation due to rotor surface loss is reduced, the permanent magnets 26 mounted between the claw-shaped magnetic poles 22A and 23A will not demagnetize and lead to a decline in output. Furthermore, since the reinforcing bodies 52 are interposed between the rotor claw-shaped magnetic poles 22A and 23A and the permanent magnets 26, heat is less likely to transfer to the permanent magnets 26 from the claw-shaped magnetic poles 22A and 23A, making suppression of demagnetization of the permanent magnets 26 even more effective.

In addition, because two permanent magnets 26 are disposed between the claw-shaped magnetic poles 22A and 23A so as to be separated from each other in a circumferential direction, generated heat is conducted to each of the permanent magnets 26 from only one of the claw-shaped magnetic poles 22A and 23A since thermal conduction from the claw-shaped magnetic poles 22A and 23A is interrupted by portions separating the permanent magnets 26. Because of this, temperature increases in the permanent magnets 26 can be reduced compared to Embodiment 2 above in which the heat generated in two claw-shaped magnetic poles 22A and 23A is conducted to each of the permanent magnets 25, thereby also providing an effect enabling characteristic deterioration and demagnetization of the permanent magnets 26 resulting from heat to be reduced.

As shown in FIG. 16, since pairs of winding phase portions having a phase difference corresponding to an electrical angle of 27.5 degrees (27.5°), which is in close proximity to a local minimum of the seventh-order harmonic at 25.7 degrees (25.7°), are connected in series, it can be seen that the induced voltage harmonics are reduced unlike conventional constructions in which the uniform pitch angle is 30 degrees (30°). Consequently, even in a field de-energized state, since harmonic components of the induced voltage generated by permanent-magnet magnetomotive force while the rotor 7B is rotating at high speed are reduced, they will not exceed a power supply voltage or an element breakdown voltage.

EMBODIMENT 4

Figure 21:
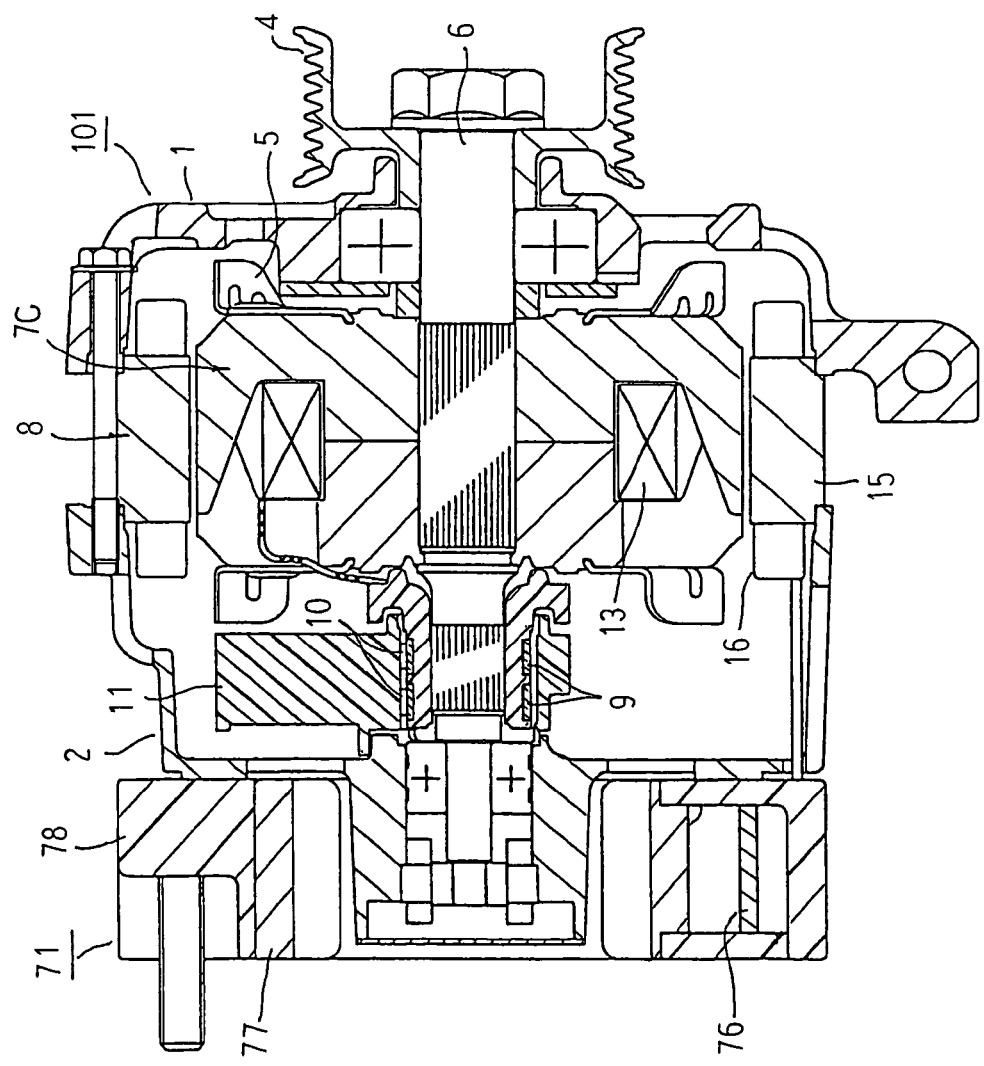
FIG. 21 is a longitudinal section showing a rotary electric machine according to Embodiment 4 of the present invention.
Figure 22:
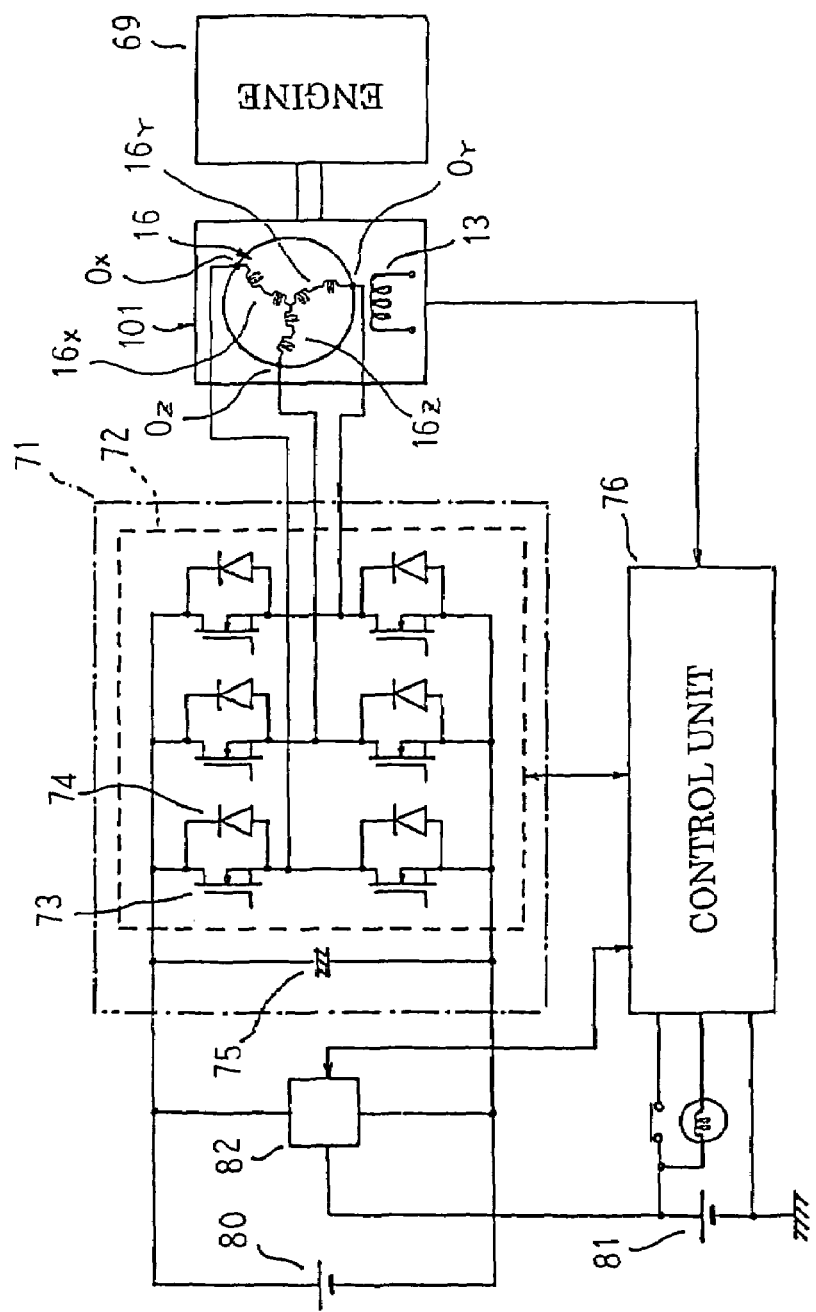
FIG. 22 is a circuit diagram showing an electrical circuit in the rotary electric machine according to Embodiment 4 of the present invention.
Figure 23:
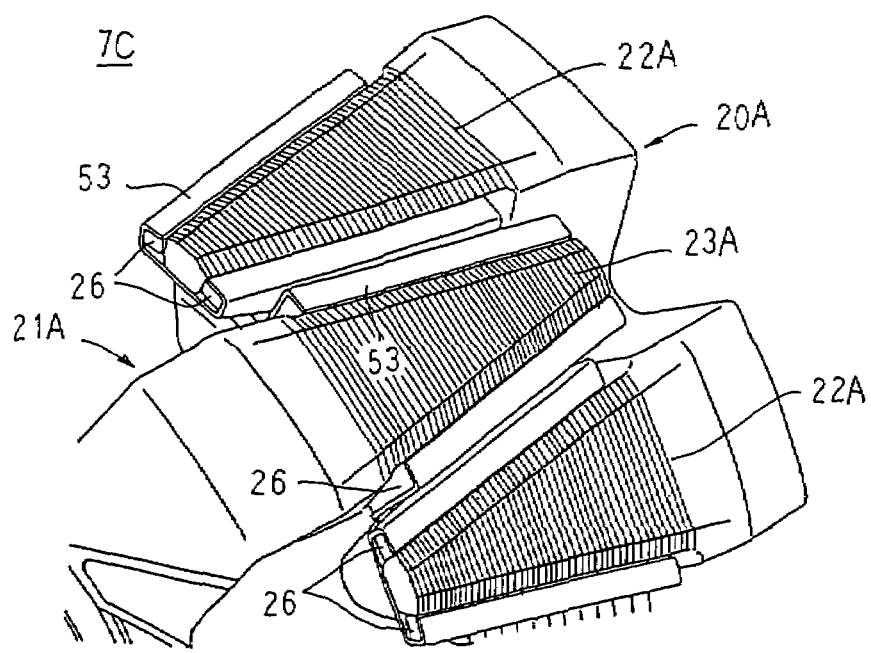
FIG. 23 is a partial perspective of a rotor used in a rotary electric machine according to Embodiment 4 of the present invention.
Figure 24:
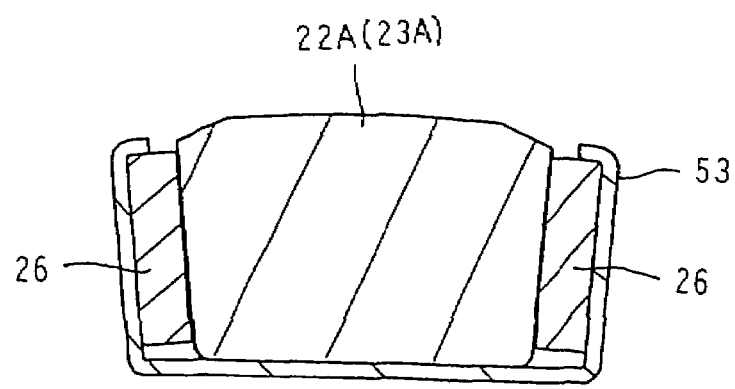
FIG. 24 is a cross section showing a pole core of the rotor used in the rotary electric machine according to Embodiment 3 of the present invention.

FIG. 21 is a longitudinal section showing a rotary electric machine according to Embodiment 4 of the present invention, FIG. 22 is a circuit diagram showing an electrical circuit in the rotary electric machine according to Embodiment 4 of the present invention, FIG. 23 is a partial perspective of a rotor used in a rotary electric machine according to Embodiment 4 of the present invention, and FIG. 24 is a cross section showing a pole core of the rotor used in the rotary electric machine according to Embodiment 3 of the present invention. Moreover, a stator 8 has a similar construction to that of Embodiment 3 above, pairs of winding sub-portions constituting an X-phase winding phase portion $16_X$, a Y-phase winding phase portion $16_Y$, and a Z-phase winding phase portion $16_Z$ each being connected in series between adjacent slots 15a having a phase difference corresponding to an electrical angle of 27.5 degrees (27.5°).

In FIGS. 21 and 22, a rotary electric machine 101 differs from that of Embodiment 3 above by having no rectifier 12, and by output from the X-phase winding phase portion $16_X$, the Y-phase winding phase portion $16_Y$, and the Z-phase winding phase portion $16_Z$ of a three-phase stator winding 16 being led outside the rotary electric machine 101.

An inverter unit 71 is mounted to an inner wall surface of the rear bracket 2 so as to be positioned on an outer periphery at a rear end portion of the shaft 6. The inverter unit 71 is provided with: an inverter module 72 composed of six switching elements 73, and diodes 74 connected in parallel with each of the switching elements 73; and a capacitor 75 connected in parallel to the inverter module 72. The capacitor 75 serves a function of smoothing the electric current flowing through the inverter module 6.

This inverter module 72 is constructed by forming element-diode sets each constituted by a switching element 73 and a diode 74 connected in parallel, connecting pairs of element-diode sets in series, and mounting three such pairs on a heat sink 77 so as to be disposed in parallel. A control unit 76 in which electronic components for controlling switching on and off of the switching elements 73 are mounted on a circuit board is housed inside a resin-molded portion 78 molded integrally with the heat sink 77 using an electrically-insulating resin. The output wires $O_X$, $O_Y$, and $O_Z$ of the X-phase winding phase portion $16_X$, the Y-phase winding phase portion $16_Y$, and the Z-phase winding phase portion $16_Z$ of the three-phase stator winding 16 are connected to respective intermediate points between the switching elements 73 connected in series.

A 36-volt first battery 80, for example, constituting a driving electric power source for the rotary electric machine 101 is connected in parallel to the inverter module 72. In addition, a 12-volt second battery 81, for example, constituting an electric power source for an electrical machinery load mounted to an automotive vehicle is also provided. Thus, a direct-current-to-direct-current (DC-to-DC) converter 82 is connected in parallel to the inverter module 72, the direct-current electric power rectified by the inverter unit 71 being converted to 12 V, for example, and supplied to the second battery 81.

This rotary electric machine 101 is linked to a crank shaft of an engine 69 by means of a belt to function as a starting and charging apparatus for the engine 69. The inverter unit 71 is connected to the rotary electric machine 101 by means of the X-phase winding phase portion $16_X$, the Y-phase winding phase portion $16_Y$, and the Z-phase winding phase portion $16_Z$ (three stator phase wires) of the rotary electric machine 101. ON/OFF switching of the switching elements 73 of this inverter unit 71 is controlled by the control unit 76 in such a way that the rotary electric machine 101 can generate starting torque (positive torque) and braking torque (negative torque).

The first battery 80 is connected to the inverter unit 71 by means of a power line and constitutes a power source for the inverter unit 71, and also supplies electric power to the rotary electric machine 101 by means of the inverter unit 71 and the three stator phase wires when the rotary electric machine 101 operates as a starting apparatus for the engine 69, and the rotary electric machine 101 operates as an alternator after the engine 69 achieves self-ignition and self-driving. Moreover, as a higher control unit for the inverter unit 71, the control unit 76 sends command signals and information concerning the rotational speed of the engine 69, etc., to the inverter unit 71, and also has a function enabling information relating to speed of and air supply to the engine 69, and information relating to temperature, etc., to be input and control commands such as intake air flow rate, fuel injection rate, ignition timing, etc., corresponding to these to be imparted to the engine 69 as output.

In this construction, it is necessary for the rotary electric machine 101 to generate a large torque in a short for time during starting and generation of braking torque, and unlike the above embodiments, it is necessary for a large current to be passed through a field winding 13 of a rotor 7C to generate a large magnetic flux.

In FIG. 23, a rotor 7C is a laminated rotor, and permanent magnets 26 are disposed on each of two side surfaces of claw-shaped magnetic poles 22A and 23A. These permanent magnets 26 are supported by the claw-shaped magnetic poles 22A and 23A through reinforcing bodies 53 that absorb centrifugal forces acting on the permanent magnets 26 during rotation of the rotor 7C. The reinforcing bodies 53, in a similar manner to those of Embodiment 3 above, are made of plates of a metal such as stainless steel, etc., having a thickness of approximately 0.5 mm, and are formed by bending a single piece of metal plate by pressing.

A cross section of these reinforcing bodies 53 perpendicular to an axial direction of the rotor 7C is a general C shape, being joined to an inner circumferential surface of the claw-shaped magnetic poles 22A and 23A by a shape following the inner circumferential surface of the claw-shaped magnetic poles 22A and 23A. The permanent magnets 26 are fixed to two end portions of reinforcing bodies 53 having the C-shaped cross section, being placed directly in contact with side surfaces of the claw-shaped magnetic poles 22A and 23A by elasticity of the reinforcing bodies 53.

By adopting a construction of this kind, even if the claw-shaped magnetic poles 22A and 23A are spread radially-outward by centrifugal force during high-speed rotation of the rotor 7C, pairs of the claw-shaped magnetic poles 22A and 23A will each simply be displaced without large stresses being generated in the permanent magnets 26, thereby preventing breakage. Since the reinforcing bodies 53 differ from those of Embodiment 3 above by having a simple C-shaped construction, their weight is light, making them further advantageous against centrifugal force, and they can be constructed simply by bending, facilitating their manufacture. In addition, because the permanent magnets 26 are placed in direct contact with side surfaces of the claw-shaped magnetic poles 22A and 23A, leakage of magnetic flux between the claw-shaped magnetic poles 22A and 23A is reduced.

In Embodiment 4, because the pairs of winding sub-portions connected in series constituting each of the X-phase winding phase portion $16_X$, the Y-phase winding phase portion $16_Y$, and the Z-phase winding phase portion $16_Z$ are each constructed in a similar manner to Embodiment 3 above so as to have a phase difference corresponding to an electrical angle of 27.5 degrees (27.5°), as shown in FIG. 14, rotor surface loss is also less than that of conventional constructions in which the uniform pitch angle is 30 degrees (30°). Consequently, since heat generation due to rotor surface loss is reduced, the permanent magnets 26 mounted between the claw-shaped magnetic poles 22A and 23A will not demagnetize and lead to a decline in output. In particular, in Embodiment 4, since the permanent magnets 26 are placed in direct contact with the claw-shaped magnetic poles 22A and 23A, heat easily transfers to the permanent magnets 26 from the claw-shaped magnetic poles 22A and 23A, but because the phase difference between the pairs of winding phase sub-portions connected in series is constructed to correspond to an electrical angle of 27.5 degrees (27.5°), temperature increases in the permanent magnets 26 are suppressed.

Because two permanent magnets 26 are disposed between the claw-shaped magnetic poles 22A and 23A so as to be separated from each other in a circumferential direction, generated heat is conducted to each of the permanent magnets 26 from only one of the claw-shaped magnetic poles 22A and 23A since thermal conduction from the claw-shaped magnetic poles 22A and 23A is interrupted by portions separating the permanent magnets 26. Because of this, temperature increases in the permanent magnets 26 can be reduced compared to Embodiment 2 above in which the heat generated in two claw-shaped magnetic poles 22A and 23A is conducted to each of the permanent magnets 25. Consequently, influences on the permanent magnets 26 of heat generated by the large magnetic flux arising due to passing large currents through the field winding 13 during starting and the generation of braking torque can be suppressed effectively.

Because the phase difference between the pairs of winding phase portions has an electrical angle of 27.5 degrees (27.59°), which is in close proximity to a local minimum of the seventh-order harmonic at 25.7 degrees (25.7°) shown in FIG. 16, the induced voltage harmonics are reduced unlike conventional constructions in which the uniform pitch angle is 30 degrees (30°). Consequently, even in a field de-energized state, since harmonic components of the induced voltage generated by permanent-magnet magnetomotive force while the rotor 7C is rotating at high speed are reduced, they will not exceed a power supply voltage or an element breakdown voltage. In particular, in Embodiment 4, since the permanent magnets 26 are placed in direct contact with the claw-shaped magnetic poles 22A and 23A, magnetic flux from the permanent magnets 26 easily flows to the claw-shaped magnetic poles 22A and 23A and induced voltages generated by permanent-magnet magnetomotive force while the rotor 7C is rotating at high speed become excessive, but the harmonic components can be suppressed effectively.

Moreover, in each of the above embodiments, the rotor may also be impregnated with a resin such as a varnish, etc. In that case, because generated heat is distributed and cooled since each of the gaps is filled with the resin, heat is not concentrated locally in the permanent magnets, making it less likely that demagnetization of the permanent magnets will occur, and effects can be achieved such as increased constraining force on each of the members and improved strength during high-speed rotation.

As explained above, according to one aspect of the present invention, there is provided a rotary electric machine including: a stator having an annular stator core in which two slots are disposed per phase per pole; and a three-phase stator winding mounted to the stator core; and a rotor rotatably disposed inside the stator for generating a magnetic flux by means of a field winding and a permanent magnet, wherein the three-phase stator winding includes a plurality of winding phase sub-portions each installed in a slot group constituted by every sixth slot of the slots; an X-phase winding phase portion, a Y-phase winding phase portion, and a Z-phase winding phase portion constituting the three-phase stator winding are each constructed by connecting in series the stator winding phase sub-portions installed in an adjacent pair of the slot groups; and the slots are formed at a nonuniform pitch in which an angle between center lines of slot opening portions alternates between an electrical angle of $\alpha$ and (60°–$\alpha$), where a does not equal 30 degrees ($\alpha \neq 30°$), thereby providing a rotary electric machine enabling eddy current loss at a rotor surface to be reduced, and harmonic components of an induced voltage induced by the permanent magnet also to be reduced.

What is claimed is:

1. A rotary electric machine comprising:
a stator having:
an annular stator core in which two slots are disposed per phase per pole; and
a three-phase stator winding mounted to said stator core; and
a rotor rotatably disposed inside said stator for generating a magnetic flux by means of a field winding and a permanent magnet,
wherein:
said three-phase stator winding comprises a plurality of winding phase sub-portions each comprising six wave winding sub-portions, wherein each wave winding sub-portion comprises a single conductor wire installed in a slot group constituted by every sixth slot of said slots and each winding phase sub-portion is formed by connecting ends of the conductor wires;
an X-phase winding phase portion, a Y-phase winding phase portion, and a Z-phase winding phase portion constituting said three-phase stator winding are each constructed by connecting in series pairs of said winding phase sub-portions installed in an adjacent pair of said slot groups; and
said slots are formed at a nonuniform pitch in which an angle between center lines of slot opening portions alternates between an electrical angle of $\alpha$ and (60°–$\alpha$), where $\alpha$ does not equal 30 degrees.

2. The rotary electric machine according to claim 1, wherein:
magnetic poles of said rotor are constituted by a solid body of magnetic material; and
a phase difference between said winding phase sub-portions connected in series corresponds to the electrical angle $\alpha$ which is greater than 30 degrees and less than or equal to 37 degrees.

3. The rotary electric machine according to claim 1, wherein:
magnetic poles of said rotor are constructed by laminating and integrating magnetic steel sheets.

4. The rotary electric machine according to claim 1, wherein:
said rotor is a claw-pole rotor having claw-shaped magnetic poles; and
said permanent magnet is interposed between an adjacent pair of said claw-shaped magnetic poles.

5. The rotary electric machine according to claim 4, wherein:
two of said permanent magnets are disposed between said adjacent pair of said claw-shaped magnetic poles such that each lies alongside a respective side surface of said claw-shaped magnetic poles so as to be separated from the other in a circumferential direction.

6. The rotary electric machine according to claim 4, wherein:
said permanent magnet is placed in contact with a side surface of said claw-shaped magnetic poles.

7. The rotary electric machine according to claim 6, wherein:
two of said permanent magnets are disposed between said adjacent pair of said claw-shaped magnetic poles such that each lies alongside a respective side surface of said claw-shaped magnetic poles so as to be separated from each the other in a circumferential direction.

* * * * *